United States Patent [19]

Egendorf

[11] Patent Number: 5,446,489
[45] Date of Patent: Aug. 29, 1995

[54] CABLE TELEVISION BILLING METHOD

[76] Inventor: Andrew Egendorf, P.O. Box 703, Lincoln, Mass. 01773

[21] Appl. No.: 187,256

[22] Filed: Jan. 25, 1994

[51] Int. Cl.⁶ .......................................... H04N 7/173
[52] U.S. Cl. ........................................ 348/3; 348/12; 348/13
[58] Field of Search ................ 348/3, 1, 7, 12, 13, 348/14, 15; 455/2, 5.1; 358/84; H04N 7/16, 7/173

[56] References Cited

U.S. PATENT DOCUMENTS

| | | | |
|---|---|---|---|
| 4,484,217 | 11/1984 | Block et al. | 348/3 |
| 4,759,060 | 7/1988 | Hayashi et al. | 348/3 |
| 5,003,384 | 3/1991 | Durden et al. | 348/3 |
| 5,146,491 | 9/1992 | Silver et al. | 379/114 |
| 5,247,347 | 9/1993 | Litteral et al. | 348/12 |
| 5,255,267 | 10/1993 | Hansen et al. | 370/85.1 |
| 5,283,789 | 2/1994 | Gunnarsson et al. | 348/6 |
| 5,357,276 | 10/1994 | Banker et al. | 348/7 |
| 5,374,952 | 12/1994 | Flohr | 348/12 |
| 5,410,343 | 4/1995 | Coddington et al. | 348/12 |

FOREIGN PATENT DOCUMENTS 220990  9/1989  Japan .............................. H04N 7/16

*Primary Examiner*—James J. Groody
*Assistant Examiner*—Chris Grant
*Attorney, Agent, or Firm*—Sprung Horn Kramer & Woods

[57] ABSTRACT

A television cable billing method comprises establishing a continuous communications link between a provider and a plurality of customers over a single duplex transmission line. A billable account number is assigned to each customer and each customer is billed a flat fee rate for the continuous communications link. A customer communicates a request for a product or service over the communications link together with the customer's billing account number. The product or service is provided to the customer over the communications link by the provider and the customer's billing account number is billed for the provided product or service. The communications link is maintained both before and after the product or service is provided.

10 Claims, 2 Drawing Sheets

CABLE TELEVISION BILLING METHOD

BACKGROUND OF THE INVENTION

The present invention relates to a cable television billing method.

While cable television services are becoming increasingly available, the billing methods have failed to keep pace with the technology. Presently, if a customer chooses to obtain a service other than a service previously contracted for, the customer must place a telephone call to the cable television provider to have that additional service provided to him. The customer and the customer's billing account number are identified during this telephone call, and the additional service is delivered and billed for. The purchase of the service made by the customer during the call, and the delivery of the service made by the provider, are separate transactions, and do not provide for timely interaction between them. For example, under the prior art cable television methods, it is not possible for a customer to request delivery of a movie and then pause transmission or request retransmission of a portion of that movie.

SUMMARY OF THE INVENTION

The main object of the present invention is to eliminate the disadvantages of the prior art cable television methods by providing a billing method that allows for a customer to utilize the existing communications link between the provider and the customer both to request and to receive products and services.

The customer typically may make a request to learn more about particular products and services offered, then request delivery of a product or service, and then interact further with the provider to tailor the delivery of the product or service to meet the customer's needs. The customer's requests can be made by keying in data from a keyboard or by oral communication. The provider can fulfill the customer's requests for products by delivery of information in the form of pictures, words, sounds and/or data, and can fulfill the customer's requests for services by conforming delivery of a product or service to the form requested from time to time by the customer or by establishing a two-way communications link with a third party and transmitting the customer's information to the third party.

These and other objects and advantages of the present invention are achieved in accordance with the present invention by a cable television billing method wherein a continuous communications link is established between a provider and a plurality of customers over a single duplex transmission line. Each customer is assigned a billing account number and each customer is billed at a flat fee rate for the continuous communications link. Each customer is able to communicate requests to the provider over the communications link, the customer's billing account number being sent automatically along with the request. After verifying that the billing number is valid, the provider bills an amount over and beyond the flat fee rate to the customer's billing account number for providing the requested product or service, and commences to fulfill the customer's request over the link. Because the communications link is duplex and remains established at all times, the customer can request additional products or services, some of which can affect previous requests, both before and after the provider commences to fulfill previous requests.

The flat fee rate charged for establishing and maintaining the continuous duplex communications link can be either no charge or a regular periodic charge.

The customer can make a request by keying in data from a keyboard on the customer's premises, or by speaking his request into a microphone if the provider has voice recognition capability.

The customer's billing account number is automatically sent by a data communications receiver/transmitter on the customer's premises to the provider so that the customer need not manually enter this data on the keyboard.

The request fulfilled by the provider can be: (1) related to the content of the product or service to be delivered (e.g., a movie, a musical score, text, data, a weather, stock market or sports report); (2) related to the method of delivery of the product or service (e.g., delivery to commence at a stated time, delivery to be halted temporarily, repeat delivery of data previously delivered, alteration of the order of delivery of data from that previously requested); or, (3) comprise a service (e.g., establishing an audio, video, and/or data transmission link between the customer and a third party, delivery of the customer's information to one or more third parties, provide a psychic reading).

Some requests can be fulfilled by the provider supplying the customer with menus of offered products, services, prices, and/or additional menus from which the customer could make further requests.

The provider can fulfill the customer's request by sending the customer (or other intended recipient) either one or more packets of data or a continuous steam of data. The provider can fulfill the customer's request by transmission of either digital or analog signals. The provider can fulfill the customer's request through either visual or aural means.

The provider can bill the customer the amount over and beyond the flat fee on the basis of an agreed value, the quantity of data transmitted, the transmission time for the transmission of the data, or the overall elapsed time involved in the transaction. The billing can be set as a function of the flat fee charge, with a higher flat fee charge permitting the customer to have lower charges for additional products and services, and vice versa. Some products and services can be provided without any additional charge.

These and other features of the present invention will be described in the following detailed description of the invention referring to the attached drawings, wherein:

DETAILED DESCRIPTION OF THE INVENTION

Figure 1:
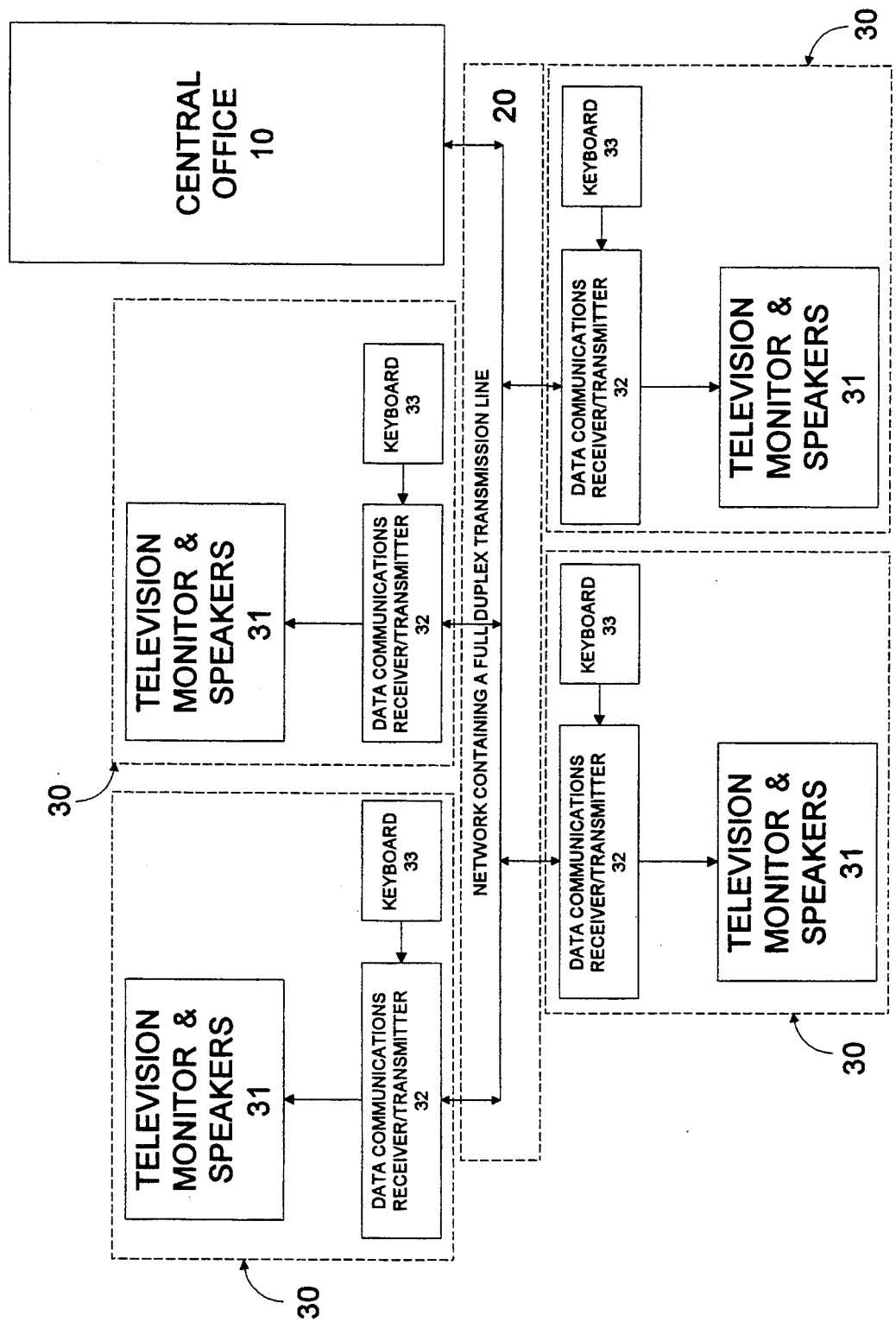
FIG. 1 is a block diagram of a system for carrying out the method according to the present invention.

As shown in FIG. 1, the system according to the present invention has a central office 10 which communicates over a network 20 to remotely located customers having communications units 30 which include a television monitor and speakers 31 for displaying audio and visual information received from the central office 10, a data communications receiver/transmitter 32 which receives data and communicates data onto the network 20, and a keyboard 33 which enables the customer to enter data to be transmitted to the central office 10. Data entered by the customer also can be displayed by the television monitor 31.

The network 20 includes a single full duplex transmission line which is capable of handling the transmission of broadband and baseband signals, both digital and analog, in both directions between each communications unit 30 and the central office 10.

Figure 2:
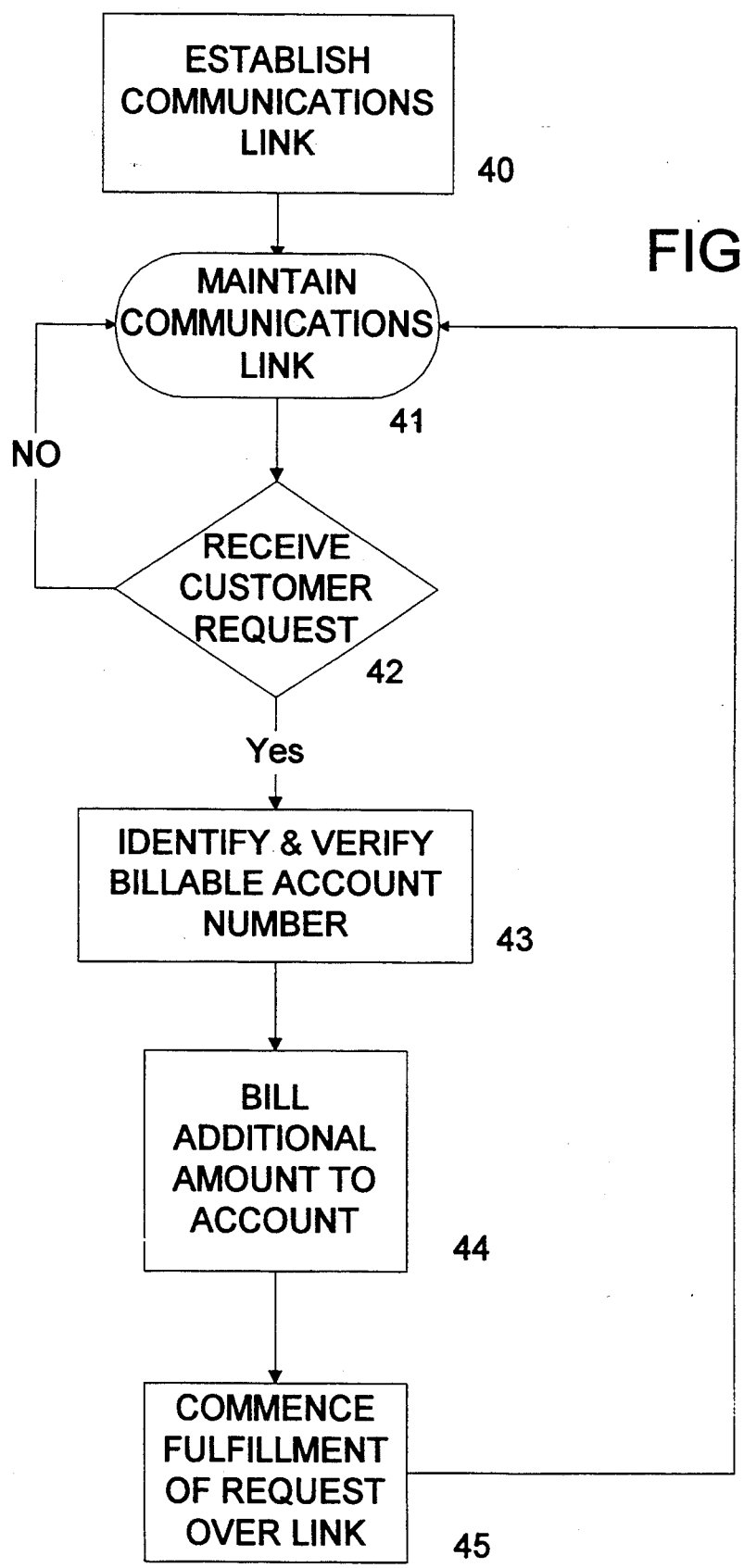
FIG. 2 is a flow chart of the method according to the present invention.

With reference to FIG. 2, the billing method according to the present invention comprises establishing the communications link in step 40 over the network 20, the communications link being a continuous full duplex transmission line between the provider and each of a plurality of customers.

Each customer is assigned a billing account number and each customer is billed a flat fee rate for the continuous communications link.

In step 41, the communications link remains established even in the absence of any transmission.

In step 42, the customer communicates a request over the transmission line of the network 20 to the central office 10.

When a customer's request is received, the request is sent along with data identifying the customer's billable account number and upon verifying that the billable account number is valid in step 43, the provider bills an additional amount to the billable account number in step 44 and then commences to fulfill the request over the communications link in step 45. The communications link remains established in step 41 after commencement of fulfillment of the request in step 45.

The providing of a product or service can be carried out by providing at least one packet of data from the central office 10 to the customer (or other intended recipient) or by providing a continuous stream of data. The central office 10 also can conform the delivery of a product or service to the form requested from time to time by the customer. The central office 10 also can act as a connection point for the sending of the customer's information (audio, video, and/or data) to one or more third parties.

The billing for the requested product or service can be based upon an agreed price for the product or service (e.g., as stated in a menu or advertisement), the quantity of data transmitted for the product or service, the transmission time for delivery of the product or service, or the overall elapsed time involved in the transaction.

Preferably, the charge for the requested product or service is a function of the flat fee paid by the customer for the continuous communications link. For example, the higher the flat fee rate, the lower the charge for the additional product or service, and vice versa.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A cable television billing method comprising the steps of:
   a) establishing a continuous duplex communications link between a provider and a plurality of customers over a common duplex transmission line;
   b) assigning a billing account number to each customer;
   c) billing each customer at a flat fee rate for the continuous duplex communications link;
   d) receiving a request for a product or service together with a billing account number from a customer via the continuous duplex communications link over the common duplex transmission line;
   e) providing the product or service to the customer via the continuous duplex communications link over the common duplex transmission line by establishing a duplex communications link between the customer and at least one third party over the common duplex transmission line and delivering data between the customer and the at least one third party via the continuous duplex communication link over the common duplex transmission line; and
   f) billing the customer's billing account number an amount in addition to the flat fee rate for the product or service.

2. The method according to claim 1, wherein the step of providing the product or service comprises providing at least one packet of data.

3. The method according to claim 1, wherein the step of providing the product or service comprises providing a continuous stream of data.

4. The method according to claim 1, wherein the step of providing the product or service comprises altering a previously requested form of delivery of a product or service to a new form of delivery in response to a request received from the customer via the continuous duplex communications link over the common duplex transmission line.

5. The method according to claim 1, wherein the step of billing for the product or service comprises billing on the basis of an agreed price.

6. The method according to claim 1, wherein the step of billing for the product or service comprises billing on the basis of the quantity of data delivered.

7. The method according to claim 1, wherein the step of billing for the product or service comprises billing on the basis of transmission time.

8. The method according to claim 1, wherein the step of billing for the product or service comprises billing on the basis of overall elapsed time.

9. The method according to claim 4, wherein the altering of the form of delivery of the product or service is made before the provider commences to provide the product or service.

10. The method according to claim 4, wherein the altering of the form of delivery of the product or service is made after the provider commences to provide the product or service.

* * * * *

UNITED STATES PATENT AND TRADEMARK OFFICE
CERTIFICATE OF CORRECTION

PATENT NO.    : 5,446,489 C1
DATED         : August 29, 1995
INVENTOR(S)   : Andrew Egendorf.

It is certified that error appears in the above-identified patent and that said Letters Patent is hereby corrected as shown below:

<u>Title page,</u>
Item [73], Assignee, "Andrew Egendorf, Lincoln, MA (US)" should read as
-- Datacraft Corporation, Lincoln, MA --

Signed and Sealed this

Seventh Day of January, 2003

JAMES E. ROGAN
*Director of the United States Patent and Trademark Office*

ище

(12) REEXAMINATION CERTIFICATE (4383rd)
United States Patent
Egendorf

(10) Number: US 5,446,489 C1
(45) Certificate Issued: Jun. 26, 2001

(54) CABLE TELEVISION BILLING METHOD

(75) Inventor: Andrew Egendorf, P.O. Box 703, Lincoln, MA (US) 01773

(73) Assignee: Andrew Egendorf, Lincoln, MA (US)

Reexamination Request:
No. 90/004,994, May 28, 1998

Reexamination Certificate for:
| | |
|---|---|
| Patent No.: | 5,446,489 |
| Issued: | Aug. 29, 1995 |
| Appl. No.: | 08/187,256 |
| Filed: | Jan. 25, 1994 |

(51) Int. Cl.⁷ .................................................. H04N 7/173
(52) U.S. Cl. ...................................................... 725/1; 725/8
(58) Field of Search .................................. 348/10, 12, 13; 455/4.2, 5.1; 725/1, 8, 5, 4; H04N 7/16, 7/173

(56) References Cited

U.S. PATENT DOCUMENTS

| | | |
|---|---|---|
| 3,997,718 | 12/1976 | Ricketts et al. . |
| 4,710,955 | 12/1987 | Kauffman . |
| 4,852,154 | 7/1989 | Lewis et al. . |
| 5,003,384 | 3/1991 | Durden et al. . |
| 5,187,710 * | 2/1993 | Chau et al. ........................ 370/110.1 |
| 5,247,347 | 9/1993 | Litteral et al. . |
| 5,329,308 | 7/1994 | Binns et al. . |
| 5,381,459 | 1/1995 | Lappington . |
| 5,420,923 | 5/1995 | Beyers, II et al. . |
| 5,434,611 | 7/1995 | Tamura . |
| 5,438,356 * | 8/1995 | Ushiki et al. .......................... 348/12 |
| 5,440,335 | 8/1995 | Beveridge . |
| 5,499,241 | 3/1996 | Thompson et al. . |
| 5,640,196 | 6/1997 | Behrens et al. . |

FOREIGN PATENT DOCUMENTS 0 568 103 A2   4/1993   (EP) .

OTHER PUBLICATIONS

"A Trial of a National Pay–Per–View Ordering and Billing System", Bulfer et al, 1986, NCTA Technical Papers.

"Wired Cities"—(Annenberg School of Communications, W.H. Dutton, 1986).

"Concepts in Recording of Services"—(4th IEEE Region 10 International Conference on Information Technologies For The 90's, Bombay, Nov. 1989).

"The Internet and Interactive Television"—(Personal Computing Magazine, Dec. 1993).

"Wired Cities"—Shaping the Future of Communications, Annenberg School of Communications, W.H. Dutton, 1986 pp. 102–123 and 179–200.

Communications of the ACM, vol. 33, No. 2, Feb. 1990, pp. 141–151, "Polychannel Systems for Mass Digital Communication", D.K. Gifford.

"Tradelink—Product Overview", 1988, pp. 1–13 & Appendix [15 pp.].

(List continued on next page.)

*Primary Examiner*—Chris Grant

(57) ABSTRACT

A television cable billing method comprises establishing a continuous communications link between a provider and a plurality of customers over a single duplex transmission line. A billable account number is assigned to each customer and each customer is billed a flat fee rate for the continuous communications link. A customer communicates a request for a product or service over the communications link together with the customer's billing account number. The product or service is provided to the customer over the communications link by the provider and the customer's billing account number is billed for the provided product or service. The communications link is maintained both before and after the product or service is provided.

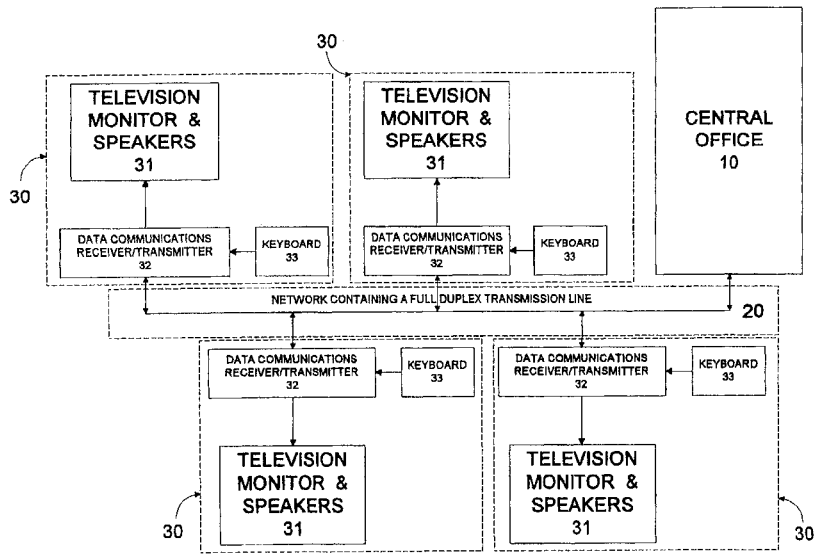

OTHER PUBLICATIONS

"Viatel Operational Requirements", May 1985, sec. 3 [15 pp.].
"Viatel Directory and Users Guide", Issue 2, Jul. 1985, pp. 69–73 [15 pp.].
"Key Facts for Service Providers", c. 1985, pp. 7–8 [2 pp.].
"Viatel—Australia's National Videotext System", Telecommunication Journal of Australia, c. Nov. 1984 [5 pp.].
"Low VIATEL prices attract major users", Telecom News, Nov. 1984 [1 pg.].
"Welcome to Viatel Kit" [4 pp.].
"Introduction of Videotex Service", Telecom Staff Information Bulletin, Nov. 1983 [2 pp.].
"Viatel Price List", Feb. 1985 [2 pp.].
"Coding Structures for the Viatel System", Aug. 1984, pp. 1–8 & Diagram [9 pp.].
"EDI in the Australian Automotive Industry", Deakin University, 1992 cover, contents page, and pp. 1–15 [10 pp.].
"Electronic Data Interchange in the Australian Automotive Industry", Centre for International Research on Communication and Information Technologies, 1992, cover, contents pages, and pp. 8–17 [13 pp.].
"VIATEL Directory and Users Guide", Jul. 1985, cover and pp. 1, 69–73 [7 pp.].
"VIATEL—Telecom's Public Videotex Service", The Telecommunication Journal of Australia, v. 34, No. 3, 1984, cover, contents page, and pp. 187–190 [6 pp.].
"VIATEL—A Value Added Service", The Telecommunication Journal of Australia, v. 34, No. 3, 1984, cover, contents page, and pp. 191–196 [8 pp.].
"Telecom News", Nov. 1984, pp. 1–4 [4 pp.].
Technology: Cable Company is Set to Plug into Internet, Mary Lu Carnevale and John J. Keller, The Wall Street Journal, Aug. 24, 1993, Database Printout, 3 pages.
CPU Status Report, Dec. 1993, Database Printout, 10 pages.
Internet Comes to Cable TV, Popular Science, V. 243, Dec. 1993, p. 51.
Internet Comes to Cable TV, Popular Science, V. 243, Dec. 1993, p. 51, Suzanne Kantra Database Printout.
Leading the Multimedia Charge, Peter Lambert, Multichannel News, Oct. 11, 1993, v. 14, n. 10A Database Printout, 6 pages.
Information Highway: The Home Front, Herb Brody, Technology Review, Aug./Sep., 1993, vol. 96, pp. 31–40.
CATV Carriers Turn the Competitive Screw on BT, John Williamson, Telephony, Apr. 26, 1993 v. 224, n. 17, p. 9, Database Printout, 3 pages.
A Future Switched Video System, John R. Gunter, 1990, pp. 30–36.
Whatever Happened to Two–Way Interactive Cable TV?, IEEE Spectrum, vol. 25, p. 19, May 1988.
Cable TV and Telephones Tie the Knot, Barry Fox, New Scientist, Nov. 5, 1987, p. 34.
Cable TV Hubs Simplify Switching, Cliff Roth, High Technology, Jan., 1983, pp. 15–18.

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–10 are determined to be patentable as amended.

New claims 11–20 are added and determined to be patentable.

1. A cable television billing method comprising the steps of:
   a) establishing a continuous duplex communications link between a provider and a plurality of customers over a common duplex transmission line;
   b) assigning a billing account number to each customer;
   c) billing each customer at a flat fee rate for the continuous duplex communications link;
   d) receiving a request for a *third party* product or service *from the third party*, together with a billing account number, from a customer via the continuous duplex communications link over the common duplex transmission line;
   e) providing the *third party* product or service to the customer via the continuous duplex communications link over the common duplex transmission line by establishing *over the common duplex transmission line* a duplex communications link between the customer and at least one third party [over the common duplex transmission line] *at an end of the duplex communications link*, and delivering data between the customer and the at least one third party via the continuous duplex [communication] *communications* link over the common duplex transmission line; and
   f) billing the customer's billing account number an amount in addition to the flat fee rate for the *third party* product or service.

2. The method according to claim 1, wherein the step of providing the *third party* product or service comprises providing at least one packet of data.

3. The method according to claim 1, wherein the step of providing the *third party* product or service comprises providing a continuous stream of data.

4. The method according to claim 1, wherein the step of providing the *third party* product or service *further* comprises altering a previously requested form of delivery of [a] *the third party* product or service to a new form of delivery in response to a request received from the customer via the continuous duplex communications link over the common duplex transmission line.

5. The method according to claim 1, wherein the step of billing for the *third party* product or service comprises billing on the basis of an agreed price.

6. The method according to claim 1, wherein the step of billing for the *third party* product or service comprises billing on the basis of the quantity of data delivered.

7. The method according to claim 1, wherein the step of billing for the *third party* product or service comprises billing on the basis of transmission time.

8. The method according to claim 1, wherein the step of billing for the *third party* product or service comprises billing on the basis of overall elapsed time.

9. The method according to claim 4, wherein the altering of the form of delivery of the *third party* product or service is made before the provider commences to provide the *third party* product or service.

10. The method according to claim 4, wherein the altering of the form of delivery of the *third party* product or service is made after the provider commences to provide the *third party* product or service.

*11. The method according to claim 1, wherein the third party product or service delivered to the customer is music.*

*12. The method according to claim 1, wherein the third party product or service delivered to the customer is a movie.*

*13. The method according to claim 1, wherein the third party product or service delivered to the customer is text.*

*14. The method according to claim 1, wherein the third party product or service delivered to the customer is a weather report.*

*15. The method according to claim 1, wherein the third party product or service delivered to the customer is a stock market report.*

*16. The method according to claim 1, wherein the third party product or service delivered to the customer is a sports report.*

*17. The method according to claim 1, wherein the third party product or service delivered to the customer is a psychic reading.*

*18. The method according to claim 1, wherein the third party product or service delivered to the customer is audio.*

*19. The method according to claim 1, wherein the third party product or service delivered to the customer is video.*

*20. The method according to claim 1, wherein the third party product or service delivered to the customer is pictures.*

* * * * *